Jan. 2, 1923.
J. W. HILL.
WIRING SYSTEM.
FILED APR. 6, 1921.
1,441,087.
2 SHEETS—SHEET 1.
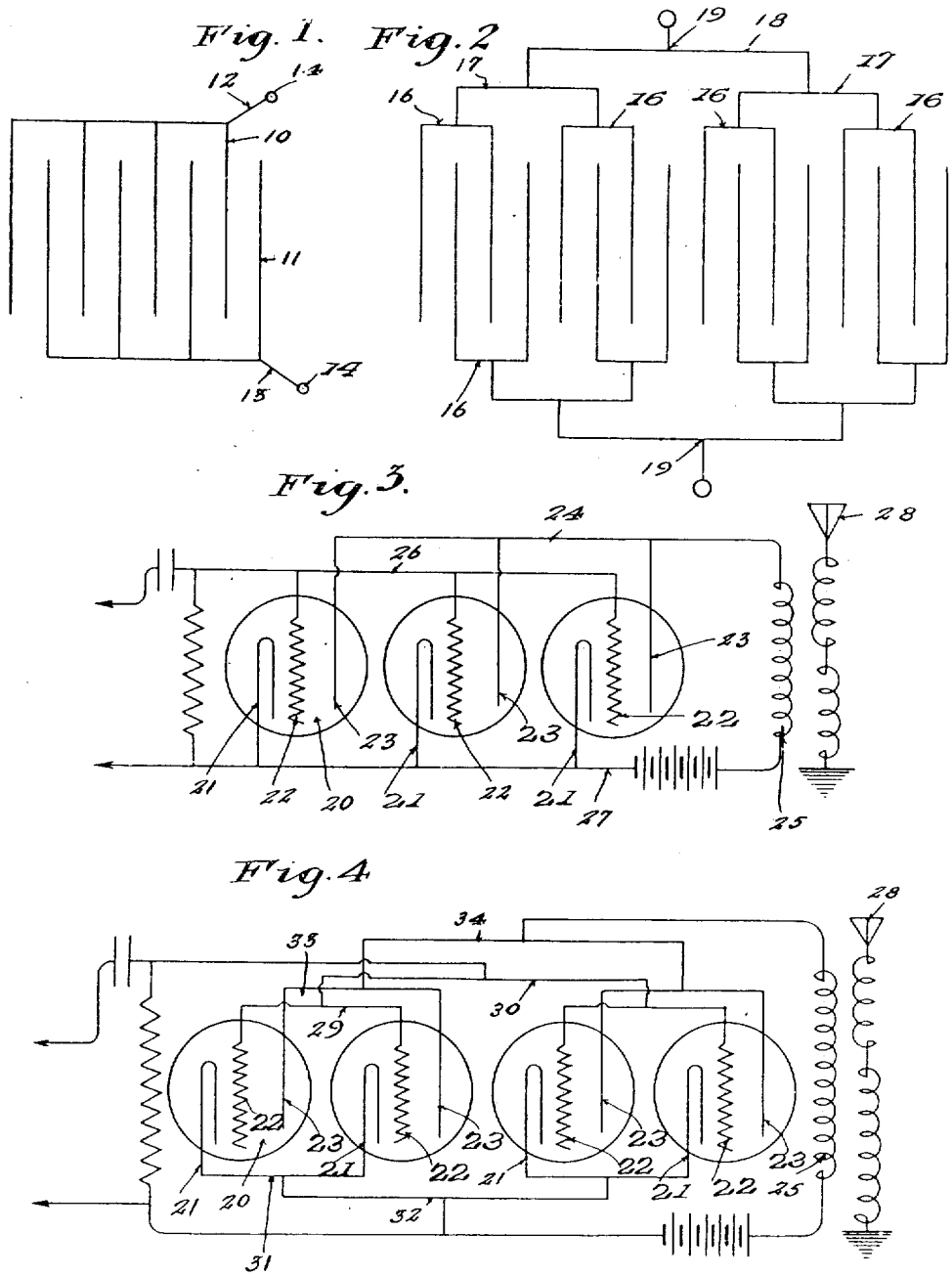
WITNESS
W. A. Williams
INVENTOR
J. W. Hill
BY
ATTORNEYS Jan. 2, 1923.

J. W. HILL.
WIRING SYSTEM.
FILED APR. 6, 1921.

1,441,087.

2 SHEETS—SHEET 2.

WITNESS
W. A. Williams

INVENTOR
J. W. Hill

BY
Munn & Co.
ATTORNEYS

Patented Jan. 2, 1923.

1,441,087

UNITED STATES PATENT OFFICE.

JOHN WILLIAM HILL, OF SALT LAKE CITY, UTAH.

WIRING SYSTEM.

Application filed April 6, 1921. Serial No. 459,103.

*To all whom it may concern:*

Be it known that I, JOHN W. HILL, a citizen of the United States, and a resident of Salt Lake City, in the county of Salt Lake and State of Utah, have invented certain new and useful Improvements in Wiring Systems, of which the following is a specification.

This invention relates to a wiring system adapted for use in connection with the transmitting circuit of wireless telegraphy.

It is a well known fact that a radio transmitter produces a broad wave length. This is proven by tuning the wave length of maximum energy from a transmitting station until a point is found where the signal is maximum. On each side of this position of adjustment, the energy will get weaker, but still the signal will be audible. The portion of the wave on each side of its maximum point is of course a loss of energy, and furthermore causes interference with other receiving stations.

By experiment I have found that a broad wave is produced by a transmitting apparatus when the wiring thereof is unequal, that is to say, the wiring of especially the capacity units in said circuit is unequal from a common point.

It is the object of this invention to provide a wiring system by which these units may be wired so that each will be disposed at an equal distance from a common point in the circuit with which they are associated, or the transmitter circuit as before referred to.

The invention is illustrated by way of comparison and example in the accompanying drawings, in which—

Figure 5:
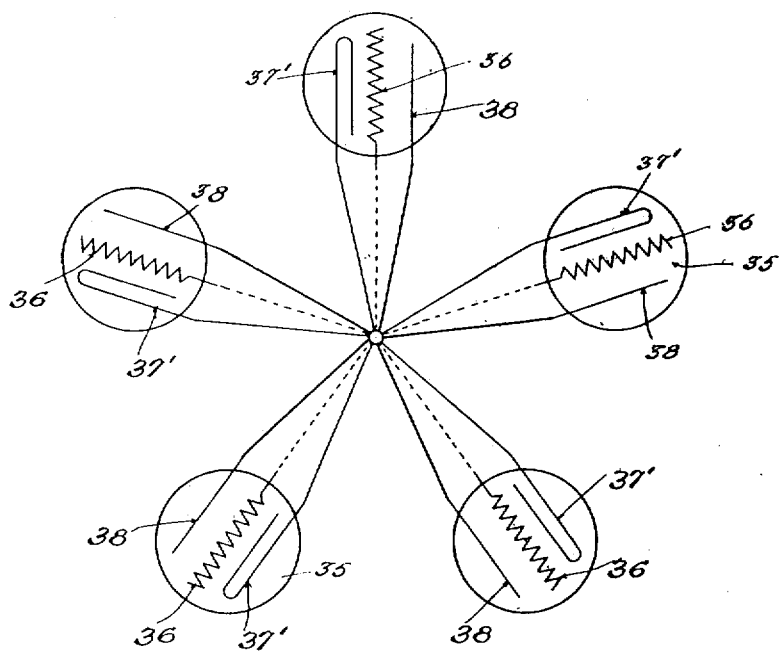
Figure 6:
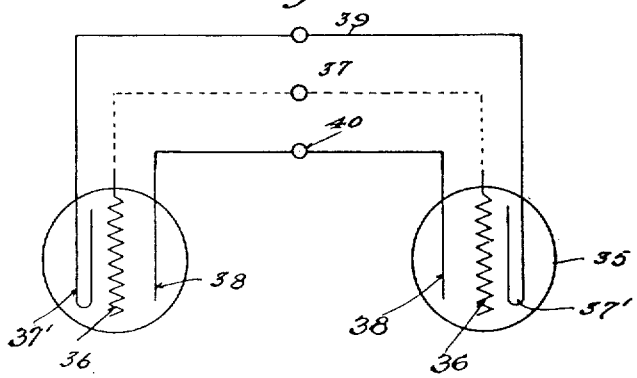

Figure 1 is a diagrammatic view showing the connection of a plurality of condenser plates, so that each plate is an unequal distance from a common point, Figure 2 is a diagrammatic view illustrating the connection of a number of condensers, divisible into pairs, and each of the condensers connected an equal distance from a given point in accordance with my invention, Figure 3 is a diagram of a wireless transmitting circuit in which audion bulbs are connected an unequal distance from a given point, Figure 4 shows a similar circuit as shown in Figure 3 and connecting the audion bulbs in accordance with my invention, Figure 5 is a wiring diagram showing the connection of an odd number of audion bulbs in accordance with my invention, and Figure 6 is a sectional diagrammatic view showing the manner in which the different units of each of the audion bulbs are connected.

Referring to the drawings, and particularly to Figure 1, 10 indicates a plurality of condenser plates of the same polarity, and 11 a like number of plates of the opposite polarity. The plates 10 are each connected to a wire 12 while the plates 11 are likewise connected to a wire 13. It is an obvious fact that if the wires 12 and 13 were connected with the transmitter circuit of the radio apparatus, the pulsations from each plate of the condenser would vary in length, that is to say, the plates nearest the points 14 of each of the connecting wires would give off the sharpest form of wave, while the succeeding plates would give successively broader forms of waves.

Referring to Figure 2, a number of condenser plates are shown, but of an even number. This must be the case in order to carry out my invention. Each pair of plates of similar polarity is connected by a wire 16, after which the adjacent pairs so formed by the connecting wires 16 are connected by a wire 17. The wires 17 connect with the wires 16 at a central point, as shown. In this instance, as may be observed, there are two wires 17 and these two wires are connected at a central point with a wire 18. The wire 18 at its middle at 19 forms a given point which is of equal distance from either of the plates 16 with which it is connected. This same manner of wiring is carried out for the condenser plates of opposite polarity as shown, and from the points 19 the wire may be led and connected with the opposite sides of the oscillating coil in the usual manner.

Referring to Figure 3, 20 indicates generally a number of audion bulbs which in this instance, is three, and of which bulbs 21 indicate the filament, 22 the grid, and 23 the plate. The plates are each led to a wire 24 which in turn leads to one side of the oscillating coil 25. The grids are likewise each connected with a wire 26 and the filaments with the wire 27. In this instance, the filament, grid and plate of each audion bulb is of unequal distance from a given point in wires 25 and 27, which primarily constitute the circuit of the oscillator 25. Such an arrangement of wiring produces the broad wave which is given off by the aerial indicated at 28.

In Figure 4 I have shown four audion bulbs 20 which are connected in accordance with my invention. Each pair of grids 22 is connected by a wire 29 and the pairs so formed are in turn connected by a wire 30, said wire 30 joining or being connected to wires 29 at a central point thereof. The adjacent filaments 21 are in turn connected together by wires 31 and the pairs so formed are connected by a wire 32, this wire 32 being in turn connected from a central point to one side of the oscillator circuit. The plates of adjacent bulbs are connected by a wire 33 and the pairs so formed are in turn connected by a wire 34, said wire 34 being then connected at a central point to the other side of the oscillator circuit. This arrangement disposes each of the elements which go to make up the audion bulbs an equal distance from a given point, and the oscillator circuit will produce and enable a narrow or sharp wave to be given off at the antenna 28 when sending.

Referring to Figure 5, 35 indicates generally a number of audion bulbs which have been arranged in circular formation, and it is to be understood that they are connected in a receiving or transmitting circuit, such as shown in Figures 3 and 4. The audion bulbs or units in this instance however are odd in number, and the wire arrangement which I have heretofore described would not be permissible. Instead the grid 36 of each bulb is led to a common point as at 37, shown in Figure 6. Likewise the filaments 37' and the plates 38 are led to the points 39 and 40, respectively, as shown in Figure 6. A wiring arrangement of this kind for an odd number of units will produce the same result with respect to the wave form transmitted as that described for Figure 4.

While I have shown and described my apparatus when used in connection with a transmitting wireless apparatus, it is to be undertsood that the same connection can be made use of in the receiving apparatus with equally good results, or it can be used when several units are wired in the aerial circuit.

I claim:—

1. The method of connecting a plurality of electrical units in a circuit which are divisible into pairs an equal distance from a given point, which consists in connecting each pair, then connecting adjacent pairs, and then connecting adjacent pairs formed by said last mentioned connection and repeating such connection of adjacent pairs until but one wire is the resultant, the central point of this wire being the point common to all the units.

2. The method of connecting a plurality of electrical units, which consists in connecting the units in pairs and then connecting said pairs to a common point, said point being of an equal distance from each unit.

3. The method of connecting an even number of electrical units, which consists in connecting said units in pairs and then connecting the pairs so formed to a common point which is an equal distance from each unit.

JOHN WILLIAM HILL.